Figures 1, 2:
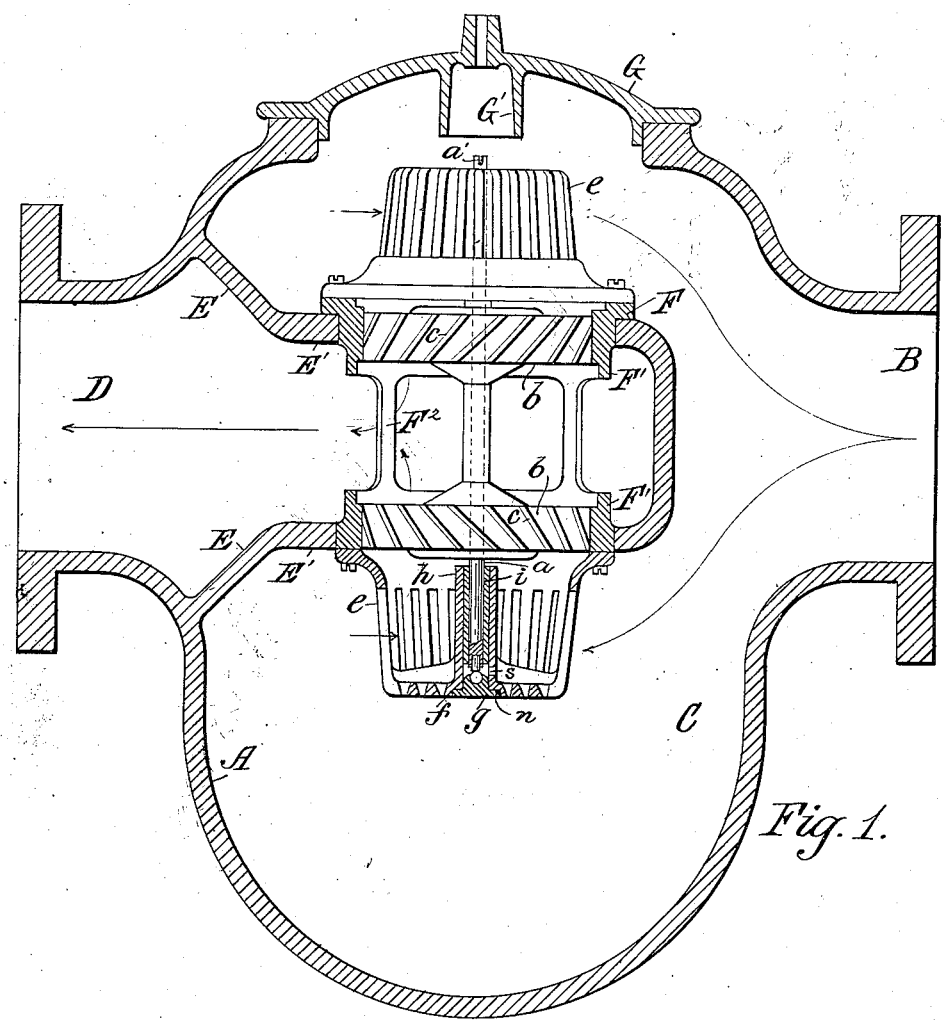

UNITED STATES PATENT OFFICE.

ERNEST E. GAMON, OF LONG ISLAND CITY, NEW YORK, ASSIGNOR TO NEPTUNE METER COMPANY, OF LONG ISLAND CITY, NEW YORK, A CORPORATION OF NEW JERSEY.

BEARING FOR WATER-METERS.

No. 856,245.     Specification of Letters Patent.     Patented June 11, 1907.

Application filed September 12, 1906. Serial No. 334,232.

*To all whom it may concern:*

Be it known that I, ERNEST E. GAMON, a citizen of the United States, residing at Long Island City, in the county of Queens and State of New York, have invented certain new and useful Improvements in Bearings for Water-Meters, of which the following is a full, clear, and exact description of the same, such as will enable others skilled in the art to which it pertains to make and use the same.

The object of my invention is to provide a bearing for water meters of such a type and construction that shall reduce the friction between the wearing parts to a minimum and thereby obviate the wear upon the parts. From the fact that in the type of water meter to which my invention is applied, the propellers are in constant rotation, the friction between the parts is ordinarily so great that such parts rapidly wear and thus the accuracy of the meter is considerably impaired. I have found that with the use of a bearing such as hereinafter described, the parts are practically indestructible and will last for years without attention or repair.

In carrying out my invention, I make use of the structure illustrated in the accompanying drawings, in which Figure 1 is a sectional view of a current meter of the preferred type, and Fig. 2 is an elevation of the bearings, partly in section.

Similar letters of reference refer to like parts throughout.

The meter to which my invention is peculiarly adapted is what is known in the art as a "current" or "velocity" meter, in other words, with this meter, the volume of water passing therethrough is inferentially ascertained by recording the number of revolutions of a reaction wheel or propeller which is properly arranged to be revolved by flowing water at a speed proportional to the velocity of the flow.

The meter case A is of the general shape and contour illustrated in Fig. 1, being substantially cylindrical in horizontal cross-section and provided with the intake B which communicates with the interior C of the case. Diametrically opposite to the intake B is the out flow D separated from the interior of the case by the walls E which project into the interior of case and are fully inclosed so as to completely separate the chamber C from the out-flow D as illustrated. The upper and lower diaphragms E' of the walls E are provided with the apertures for the reception of the operating parts of the meter. Fitting into said apertures is the propeller case F which consists of the upper and lower rings F' connected by the skeleton bars $F^2$. Mounted upon the upper and lower ends of the member F are the strainers e of grid form provided with the spiders f at their ends for supporting the bearings g, the lower bearing and strainer being shown in cross-section. These spiders f have integrally connected to them the sleeve bearings h both top and bottom, within which are the hard rubber bushings i.

The essential features of the meter A above referred to are the vertical position of the axis or shaft a and the mounting thereon of two propellers b, the said propellers having helical blades c formed on their edges, one a right hand spiral and the other a left hand spiral, which cause the stream of water flowing in from the intake B through the strainers e to divide and flow through both the propellers b in equal volume and at equal velocities.

The propellers b are accurately molded from hard rubber and have hollow water tight chambers, their proportions being such that the specific gravity of the propellers b added to that of the phosphor bronze shaft a upon which they are mounted is but slightly greater than that of water with the result that when they are immersed in water they sink but slowly; in consequence of this, together with the fact that no dynamic thrust either one way or the other is produced upon the spindle by movement of the water, it will be apparent that as the pivot has practically no weight to sustain, the wear would appear to be almost *nil*; however, in practice, it is found that with the ordinary ball bearings commonly used under such conditions, the wear is so great as to quickly render the meter inaccurate in results.

The phosphor bronze propeller shaft revolves in long hard rubber bushings i, but as a matter of fact, these bushings perform only the nominal duty of maintaining the propellers concentric with their casing, as the propellers are accurately balanced to prevent centrifugal or sidewise thrust; and the outward flow, after passing the propellers being from center to circumference, has practically no detrusive effect upon the shaft $a$.

In order to reduce such wear as really does take place between the shaft $a$ and its supporting bearing to a minimum, I provide the following construction. I provide in the lower end of the shaft $a$, a cavity $k$ into which is inserted the cylindrical hard rubber bearing $l$ having the flat end or bearing surface $m$. The lower end of the sleeve $h$ of the spider $f$ is recessed as shown at $n$ in Fig. 1, and into this recess, I insert the bearing $o$, securing the same into said recess by means of the flange $p$ accurately fitted and held in position in any convenient or desired manner. In the upper end of the bearing support $o$ is a spherical cavity $q$ in which is secured $r$ an agate ball, the ball being held in position by spinning the margin of the cavity $q$ down upon the upper portion of the ball $r$ leaving a portion of the ball exposed as shown in the drawings. Any non-oxidizing hard substance as glass, quartz, or hard metal silicate, will answer as well under ordinary circumstances, but for the best results, I prefer to use agate for one of the bearings. The bearings as shown being always immersed in water and the water having access thereto through the apperture $s$ in the sleeve $h$, it is found that no lubrication is necessary; in fact the water itself forms a perfect lubricant for the hard rubber $l$ upon the agate ball $r$. It should be understood in this connection that the parts may be reversed $i. e.$, the agate surface may be flat and the hard rubber may be spherical. I find that such a structure composed of hard rubber working upon the agate ball $r$ makes a practically indestructible and frictionless bearing, so much so, as to require practically no attention whatever and one which will last for years.

The gear train, common to such structures, is carried by the cap G and is located in the cavity G' being connected to the bifurcated upper end $a'$ of the shaft $a$.

It will thus be seen that the bearing, when in position is admirably adapted to the structure of a current meter as above described and illustrated in the drawings. The bearing is capable of use in many other relations, however, and I do not limit its use to water meters of the type shown.

I claim:

1. In a bearing member for water meters, the combination of a cylindrical block having a spherical socket in its end, and an agate ball fitted into said socket and fixedly held in position therein by the spun margin of the socket overlapping the upper surface of said ball.

2. A bearing for water meters comprising a shaft having a cylindrical socket in its end, a hard rubber block fitted into said socket and a fixed agate ball against which said hard rubber block bears.

3. A bearing for water meters comprising a shaft having a hard rubber bearing surface at its end, and a fixed block of agate having a spherical surface against which said rubber bearing surface rests.

4. A bearing for water meters and the like, comprising a vertical shaft or spindle having a cylindrical socket in its lower end, a cylindrical block of hard rubber secured in said socket leaving an exposed end bearing surface, and a fixed agate bearing having a spherical surface upon which said rubber rests.

5. In a bearing, the combination of a vertical shaft having a flat rubber bearing at its end, with a spherical bearing surface upon which said rubber bearing rests.

6. In a bearing of the type specified, the combination of a block of hard rubber having a flat bearing surface, and a hard non-oxidizable substance having a spherical bearing surface against which said flat rubber surface rests.

This specification signed and witnessed this 7th day of Sept. 1906.

ERNEST E. GAMON.

Witnesses:
C. E. WENZEL,
FREDK. C. FISCHER.